United States Patent [19]

Takano et al.

[11] Patent Number: 5,124,527
[45] Date of Patent: Jun. 23, 1992

[54] ARC WELDING METHOD AND APPARATUS

[75] Inventors: Hideaki Takano; Jitsuo Nakata, both of Wakayama, Japan

[73] Assignee: Kyodo Oxygen Co., Ltd., Japan

[21] Appl. No.: 637,829

[22] Filed: Jan. 7, 1991

[30] Foreign Application Priority Data

Feb. 21, 1990 [JP] Japan .................................. 2-40349
Apr. 13, 1990 [JP] Japan .................................. 2-39829

[51] Int. Cl.$^5$ .............................................. B23K 9/173
[52] U.S. Cl. .............................. 219/137.2; 219/137 R
[58] Field of Search ............. 219/137 R, 137.2, 137.61, 219/137.62

[56] References Cited

FOREIGN PATENT DOCUMENTS

| | | | |
|---|---|---|---|
| 55-94782 | 7/1980 | Japan ................... | 219/137.61 |
| 59-16680 | 1/1984 | Japan ................... | 219/137.62 |
| 395200 | 2/1974 | U.S.S.R. ................ | 219/137 R |

*Primary Examiner*—Clifford C. Shaw
*Attorney, Agent, or Firm*—Wall and Roehrig

[57] ABSTRACT

A method of consumable electrode arc welding is shown wherein the leading consumable electrode wire is mounted in parallel with a trailing filler wire, the latter inserted into a molten metal bath. Welding current is divided between the consumable electrode wire and the filler wire. These modifications improve the wettable boundary of the molten metal bath, prevent defects in the weld, and provide a high speed, highly efficient and high quality method of welding carbon steels, alloy steels, as well as aluminum and its alloys in a fully automatic as well as a semiautomatic operation. In an apparatus utilizing the above method, a single torch contains the consumable electrode and filler wire. One or more insulating contact tubes containing filler wire are mounted in a gas shield in parallel with a conductive contact tube containing consumable electrode wire. The unit is small in size and light-weight, and thus convenient for a welder to carry or hold during operation. Appropriate selection of one of the filler wires provided allows multidirectional operation without reorienting the torch. The unit produces a high-quality weld at rapid welding rates and is suitable for automatic and semiautomatic operation.

5 Claims, 7 Drawing Sheets

ARC WELDING METHOD AND APPARATUS

BACKGROUND OF THE INVENTION

This invention relates to improvements in a hot wire metal electrode inert gas (hereinafter MIG), welding torch, and to an improved method of consumable electrode arc welding for carbon steels, alloy steels, aluminum and its alloys, and other types of metallic materials. The invention is applicable to semi-automatic welding practice.

Many attempts to improve consumable electrode arc welding techniques have been made with the object of attaining high speed and efficiency, yet maintaining the high quality of conventional welding methods.

For instance, a method in which a plurality of electrodes are mounted inside a shield nozzle and a welding operation is carried out while the phase of a pulsed voltage or pulsed current supplied to each of said electrodes is shifted, has been proposed in a Japanese laid-open patent application (Kokai) No. 63-313674. Another type of welding equipment was described in Kokai No. 59-16680, in which the molten consumable electrode forms a spray pattern. This device has a means for supplying a separate metal filler wire into an arcuate area in such a way that the filler wire can contact the molten portion of the base metal being welded. The filler wire is heated by resistance, and there is a control means for adjusting the heating current in the filler wire to less than one-half of the welding current.

Although the aforementioned methods employ a pulsed voltage or a pulsed current in order to prevent arcing interference between the electrodes and to avoid interference between the consumable electrode and the filler wire, the control apparatus is complicated. As an additional example, another application, Kokai No. 63-20184, proposed apparatus in which the electrodes of two torches are positioned very close to one another; on one side the electrodes are in contact with the anode of the welding direct current supply, and on the other side the electrodes and base metal were connected to the cathode. In Kokai No. 63-313674 a plurality of electrically insulated electrodes is installed within a shield nozzle and the pulsed voltage, as well as the pulsed current, is phase-shifted and distributed such that each electrode in turn has a peak period, in turn, during a welding operation.

Hot wire MIG practice, described in the aforementioned Kokai Nos. 59-16680 and 63-20184 is superior to conventional MIG welding in that it allows an increased welding rate. However, hot wire MIG welding requires two welding torches of relatively large dimensions; one for the consumable electrode and the other for a filler wire.

While the prior art methods are applicable to a fully automatic welding machine, they are not suitable for semi-automatic welding in which a welder is required to carry or hold the welding torches during the procedure. High-speed, semi-automatic welding has long been desired in the art, but has not yet been achieved.

Another problem in the art which hinders high-speed welding operations is undercutting. When severe, undercutting will cause the formation of irregular beads in the weld which results in inconsistent weld quality. This phenomenon is believed to be caused by plasma current generated by the arc which gouges the molten base metal and affects the wettable interface at the walls of the molten metal bath developed during the arc welding process.

In high-speed welding it is generally necessary to increase the welding current in order to achieve a suitable penetration depth and metal deposit quantity. On the other hand, it is recognized that increasing the welding current results in increased plasma current with attendant risk of undercutting and formation of irregular beads. Control of the welding current has proven to be difficult. While high-speed welding can be achieved by employing the multi-electrode welding method described in Kokai No. 63-313674, formation of stable welding beads remains difficult because of the aforementioned problems of bead formation and also excess sputtering.

It is important to recognize that increasing the speed of deposition is not equivalent to increasing the rate of welding. Thus, even if deposition speed is accelerated, high-speed welding cannot be attained when welding current is increased to obtain sufficient penetration. Thus, increasing the speed of deposition confers higher welding efficiency, but not necessarily an increase in welding rate.

When welding aluminum and its alloys, additional weld defects are known which include cracking, porosity, weld distortion, and puckering. There are a number of known useful techniques to minimize these problems. These include reducing the weld heat input as much as possible, controlling the bath temperature, and applying reverse distortion. However, utilizing such techniques reduces welding performance.

The puckering phenomenon, which occurs when welding aluminum and its alloys, is described, for example, in the "Journal of Light Metal Welding", Volume 22, No. 9, pp. 395-407 (1984). This generally takes place under excessive weld current or with insufficient shielding. To prevent puckering of aluminum welds, controlling weld current or increasing the amount of shield gas are considered to be effective countermeasures. Again, these countermeasures cause a reduction in welding efficiency and increase the required amount of shield gas, resulting in uneconomical welding practice.

Figure 9:
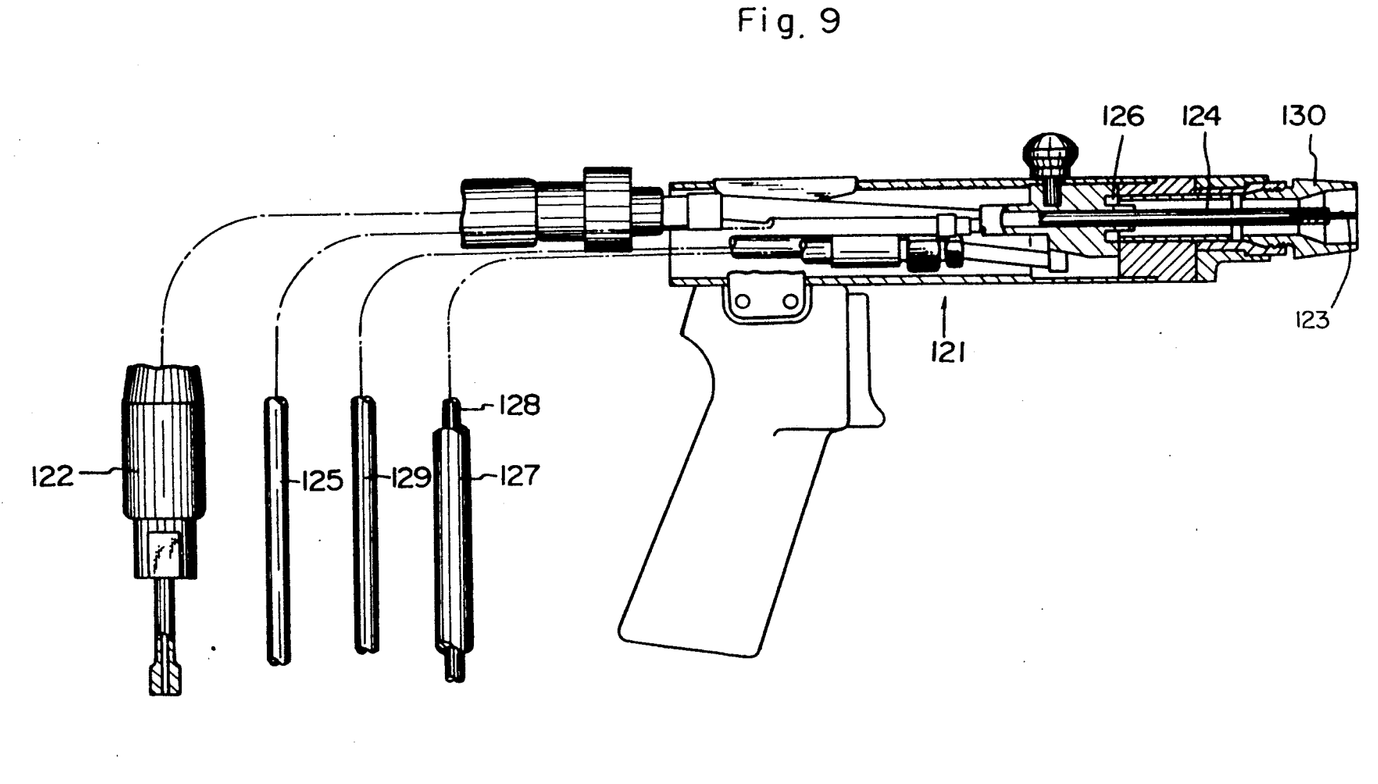
FIG. 9 is a side elevation with portions broken away of a conventional water cooled semi-automatic welding torch.

In a conventional semiautomatic welding torch, as illustrated in FIG. 9, a consumable electrode wire 23, which is supplied by a wire feeding device (not shown) through a flexible conduit 22, is passed inside a conductive contact tube 24, disposed in a welding torch 21. Shield gas is supplied through a gas hose 25 and is directed to a weld through cylindrical gas nozzles 26, which are coaxially mounted around the conductive contact tube 24. A welding current is conducted to a contact point on the consumable electrode wire 23 through a lead wire 28 inserted within a cooling water hose 27 through conductive contact tube 24. This current arcs across a gap to the base metal (not shown).

Cooling water is supplied through cooling hose 29 in order to cool nozzle 30. The cooling water is then exhausted into cooling hose 27 to cool the lead wire 28.

In the welding torch described above, only consumable electrode wire is generally supplied. Therefore, in order to perform hot wire MIG welding, separate torches for consumable electrode wire and filler are required.

OBJECTS AND SUMMARY OF THE INVENTION

The object of this invention is, therefore, to overcome the above-mentioned technical problems associated with conventional welding methods.

Another object of the present invention is to provide a method of consumable electrode arc welding having excellent welding speed, efficiency, performance capability, and weld quality.

It is still another object of the present invention to provide a small, light-weight welding torch suitable for carrying or holding by a welder for semi-automatic welding.

It is yet a further object of the present invention to provide a welding torch suitable for hot wire MIG welding whereby a welding operation can be performed while inserting the hot wire into a molten bath formed by an arc from a consumable electrode wire.

In order to achieve the objects of the invention, the following important areas were investigated:

(1) Improvement in welding speed—In order to increase welding speed, a filler wire is inserted into the molten metal bath. A fraction of the welding current is divided through the filler wire and subsequently returned to a ground terminal of the welding power source. With this improvement, as a result of melting of the filler wire, there is enhanced wettability at the boundary of the molten metal bath and the formation of irregular beads can be prevented. Moreover, since the current in the consumable electrode wire and the filler wire flow in opposite directions, the arc is always directed forward in the direction of welding. The filler wire and consumable electrode wire are aligned in parallel and closely spaced. This arrangement allows for a sufficiently deep penetration which, as discussed above, has been a problem in high-speed welding technology.

(2) Improvement in welding efficiency—The insertion of the filler wire into the molten metal bath increases its melting speed. Different supply ratios of filler wire to consumable electrode wire were evaluated to determine optimum welding conditions.

(3) Improvement in welding operational efficiency (Particularly in respect to semiautomatic welding)—In conventional hot wire consumable electrode arc welding, the consumable electrode wire and filler wires are not aligned in parallel. The interwire distance is varied by either changing the arc length or the wire tip length. The results are often inconsistent.

In the present invention, the consumable electrode wire and the filler wires are mounted in parallel. The interwire-tip distance was investigated. To prevent splashing of molten metal from the filler wire by the force of the welding arc, the welding current is divided between the consumable electrode wire and filler wire, and returned to the ground terminal of the welding power source, so as to generate a mutually repellent electromagnetic force. This force acts to divert the arc in the direction of advancement of the welding instrument and the filler wire can thereby be smoothly inserted into the molten metal bath.

(4) Prevention of weld defects—The puckering phenomenon seen with aluminum welding was investigated. It was found that puckering was mainly caused by molten metal flowing outward under the influence of the arc force, as described in the aforementioned article, and by oxides formed on the surface of the molten metal bath.

Based on these findings, it was determined that increasing the size of the molten metal bath by inserting the filler wire therein and maintaining the bath at a relatively low temperature can effectively and efficiently prevent puckering.

It was also observed that weld distortion can be significantly reduced by inserting the filler wire into the molten metal bath and reducing the bath temperature.

According to the present invention, the consumable electrode wire is the leading wire in the direction of welding, the filler wire is the trailing wire, and the interwire angle should not exceed twenty degrees.

Under these conditions, both wires are mounted inside the shield nozzle. An arc is generated by the consumable electrode wire and the filler wire is inserted into the molten metal bath. A fraction of the welding current flowing from the consumable electrode wire to the base metal is divided through the filler wire and returned to the ground terminal of the weld power source. The welding parameters were as follows:

For purpose of the following discussion, the forward insertion angle is defined as the acute angle between a wire and a vertical line when the wire tip is aimed forward in the direction of welding. The reverse insertion angle is defined as the acute angle between a wire and a vertical line when the wire tip is aimed opposite the direction of welding.

Leading wire—consumable electrode wire—trailing wire—filler wire; insertion angle of leading wire—forward angle fifty degrees maximum; reverse angle fifty degrees maximum; insertion angle of trailing wire; forward angle fifty degrees maximum—reverse angle fifty degrees maximum.

Interwire angle—maximum twenty degrees.

Interwire-tip distance (mm)—maximum twenty times the square root of the welding speed in meters per minute.

Utilization ratio of filler wire to consumable electrode wire 0.1–1.8.

Under these conditions, both wires were mounted inside the shield nozzle. An arc was generated by the consumable electrode wire and the filler wire was inserted into the molten metal bath. A fraction of the welding current flowing from the consumable electrode wire to the base metal was divided through the filler wire and returned to the ground terminal of the weld power source. Consumable arc welding was then performed under the preceding conditions:

The reasons why the above limitations in the welding conditions were established will now be discussed in greater detail.

(A) Interwire angle. If the interwire angle exceeds twenty degrees, the filler wire cannot be consistently inserted into the molten metal bath. Therefore, the maximum interwire angle was established at twenty degrees. Furthermore, whenever the arc length or wire tip length was varied, inconsistent weld beads resulted.

(B) Insertion Angles of Wires—If the insertion angles of either the leading or trailing wires exceed fifty degrees, molten metal is caused to splash in a forward direction by the arc. Hence, the insertion angles of both wires was established at fifty degrees maximum. If the insertion angle of the trailing wire exceeds fifty degrees, molten metal splashes backward and causes sticking whereby the trailing wire cannot be smoothly and consistently inserted into the molten metal bath.

Interwire-tip distance—The interwire tip distance has been established no greater than at twenty times the square root of the welding speed in millimeters/minutes. If the interwire-tip distance exceeds this value, the filler wire cannot be smoothly inserted into the molten metal bath, resulting in irregular bead formation, as illustrated in FIG. 3.

The interwire-tip distance in this invention is defined as the distance between a point immediately below the arc of the leading wire and the point of contact between the trailing wire and the molten metal bath.

Figure 3:
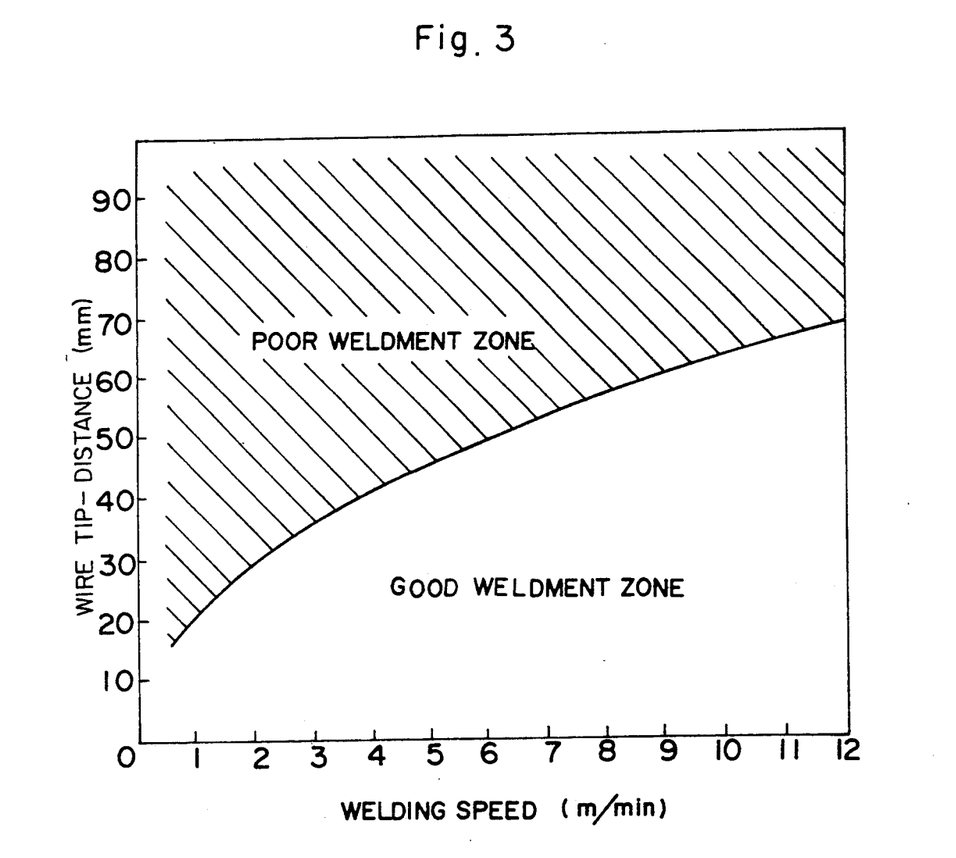
FIG. 3 graphically shows weld quality as a function of welding speed and interwire-tip distances.

FIG. 3 shows weld quality as a function of welding speed and interwire-tip distance under a welding current of 300–1,500 A, and wire diameter of 1.2–4.8 millimeters.

(D) Wire utilization ratio—If the utilization ratio of the filler wire and consumable electrode wire is less than 0.1, there is insufficient filler wire and the molten metal bath is too small to maintain a reduced bath temperature. On the other hand, if the utilization ratio exceeds 1.8, there will be excessive filler wire, causing the bath temperature to be too low, resulting in sticking and inconsistent welding.

According to the present invention, the consumable electrode wire and filler wire are both mounted inside the shield nozzle in predetermined spaced relationship. A fraction of the welding current flowing from the consumable electrode wire to the base metal is diverted through the filler wire. The arc generated by the consumable electrode wire produces a molten metal bath into which the filler wire is inserted. This causes an enhanced wettable interface between the molten metal and the bath wall. Moreover, as the arc is traveling in a forward direction, sufficiently deep penetration can be maintained. Furthermore, the size of the molten metal bath can be increased and the bath maintained at a relatively low temperature.

In the present invention an improved arc welding method is realized by a miniaturized, light-weight welding apparatus in which both the consumable electrode wire and filler wire are supplied in a single torch unit. A consumable electrode type welding torch is provided in which a conductive contact tube containing consumable electrode wire is coaxially inserted within the shield nozzle of the welding torch. An insulated contact tube holding filler wire is connected to a flexible conduit and mounted parallel to the conductive contact tube. In different embodiments of the invention between one and four insulating contact tubes containing filler wire are inserted into the shield gas nozzle and aligned parallel to the conductive contact tube containing the consumable electrode wire. The insulating contact tubes are connectable to flexible conduit for supplying filler wire, which is then supplied at points around the conductive contact tube containing the consumable electrode wire. The advantage of multiple insulating contact tubes can be readily appreciated. A torch having one insulated contact tube will permit a unidirectional welding operation in which the consumable electrode wire leads the filler wire. In torches having 2–4 insulating contact tubes, one can perform welding in up to four directions by merely selecting the appropriate contact tube to supply trailing filler wire without physically reorienting the welding equipment.

In embodiments having more than two insulating contact tubes, there are metal fittings attached to the flexible conduits so that unused insulating contact tubes can be capped to prevent air intake through the rear of the nozzle.

Insulating contact tubes may be made from ceramic or heat resistant plastics.

BRIEF DESCRIPTION OF THE DRAWINGS

For a better understanding of these and other objects of the present invention, reference will be made to the following detailed description of the invention which is to be read in conjunction with the following drawings, wherein.

DETAILED DESCRIPTION OF THE PREFERRED EMBODIMENT

Figure 1:
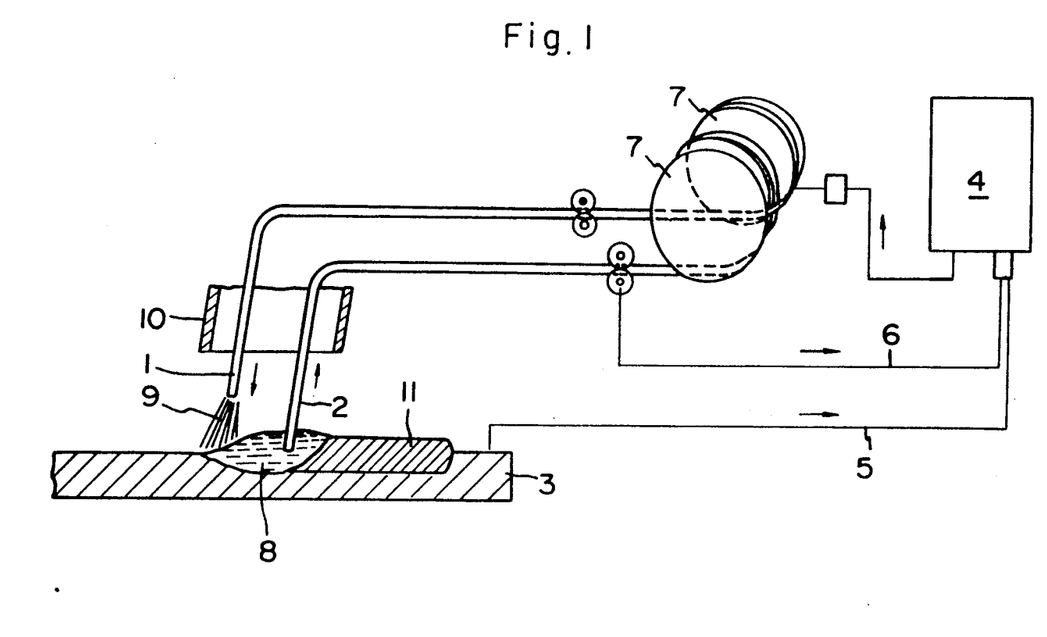
FIG. 1 is a schematic illustration depicting a system embodying the teaching of the present invention.

Turning now to the drawings, and in particular to FIG. 1, showing an embodiment of the present invention, a consumable electrode wire 1 is in a leading position in the forward direction of the welding operation, while a filler wire 2 having a composition substantially the same as that of the consumable electrode wire, trails the consumable electrode wire. The consumable electrode wire 1 and the filter wire 2 are mounted approximately parallel to one another.

A portion of the welding current flowing from the consumable electrode wire 1 to the base metal 3 is divided through filler wire 2 by grounding base metal 3 and filler wire 2 to the weld power source through ground wires 5 and 6, respectively.

There are shown in FIG. 1 a wire reel 7, a molten metal bath 8, an arc 9, a gas nozzle 10, and a weld metal 11. Arrow marks in FIG. 1 indicate the direction of current flow.

The above described technique may be applied to continuous tack welding of steel pipe which normally requires a high-speed welding process.

EXAMPLE 1

Using a low carbon steel welded pipe (wall thickness 12.7 millimeters, outer diameter 30 inches, and length 12 meters), welding operations were performed while changing the insertion angle of the wire as shown in Table 1. Table 2 compares the weld speed and quality of welding according to the present invention to conventional welding methods.

As seen in Table 2, while conventional welding speed cannot exceed 7 meters per minute, the present invention can attain a stable high-speed welding rate of 12 meters per minute by restricting the interwire angle ($\theta_3$) to less than 20 degrees and by advancing the consumable electrode wire while trailing the filler wire.

EXAMPLE 2

In accordance with the welding procedures of Example 1, bead-on-plate welding was performed on 12 mm thick steel plate to evaluate undercutting.

The welding conditions were as follows:

Weld current 270 A; shield gas; 100% $CO_2$; shield gas flow rate 20 liters per minute; consumable electrode wire JIS YGW12; consumable electrode wire angle 5% (advancing); consumable electrode wire diameter 1.2 millimeters; filler wire JIS YGW12; filler wire angle 5% (advancing); filler wire diameter 0.9 millimeters; interwire angle 0%; interwire-tip distance 8 millimeters.

Table 3 compares the weld quality produced by the present invention and that produced by conventional welding methods.

As seen in Table 3, when the welding rate by the conventional method exceeds 1.6 meters per minute, the appearance, inner structure, and degree of sputtering were unsatisfactory. At speeds exceeding 1.8 meters per minute it was observed that undercutting occurred. On the other hand, when welding in accordance with the present invention, good appearance, inner structure, and acceptable sputtering were observed until the welding speed reached 2.4 meters per minute. In addition, no undercutting was noted up to welding speeds of 2.6 meters per minute.

EXAMPLE 3

Welding was performed on aluminum alloys utilizing the procedures of Example 1 under the conditions listed in Table 4. The interwire angles, interwire-tip distances and supply ratios between the consumable electrode and filler wires were varied. The results are listed in Table 5.

As shown in Table 5, the following conditions will produce excellent weld quality; namely, wire insertion angles ($\theta_1$, $\theta_2$) may be up to fifty degrees for both the leading and trailing wires, the interwire angle ($\theta_3$) should not exceed twenty degrees, the interwire-tip distance should not exceed twenty millimeters, and the utilization ratio (r) of the consumable electrode wire and filler wire may vary from 0.1–1.8.

EXAMPLE 4

Aluminum was welded in accordance with the present invention and by conventional MIG welding to compare puckering.

The welding conditions were as follows: weld current 300–500 A; welding speed one meter/minute; filler wire supply amount forty grams per minute.

Figure 2:
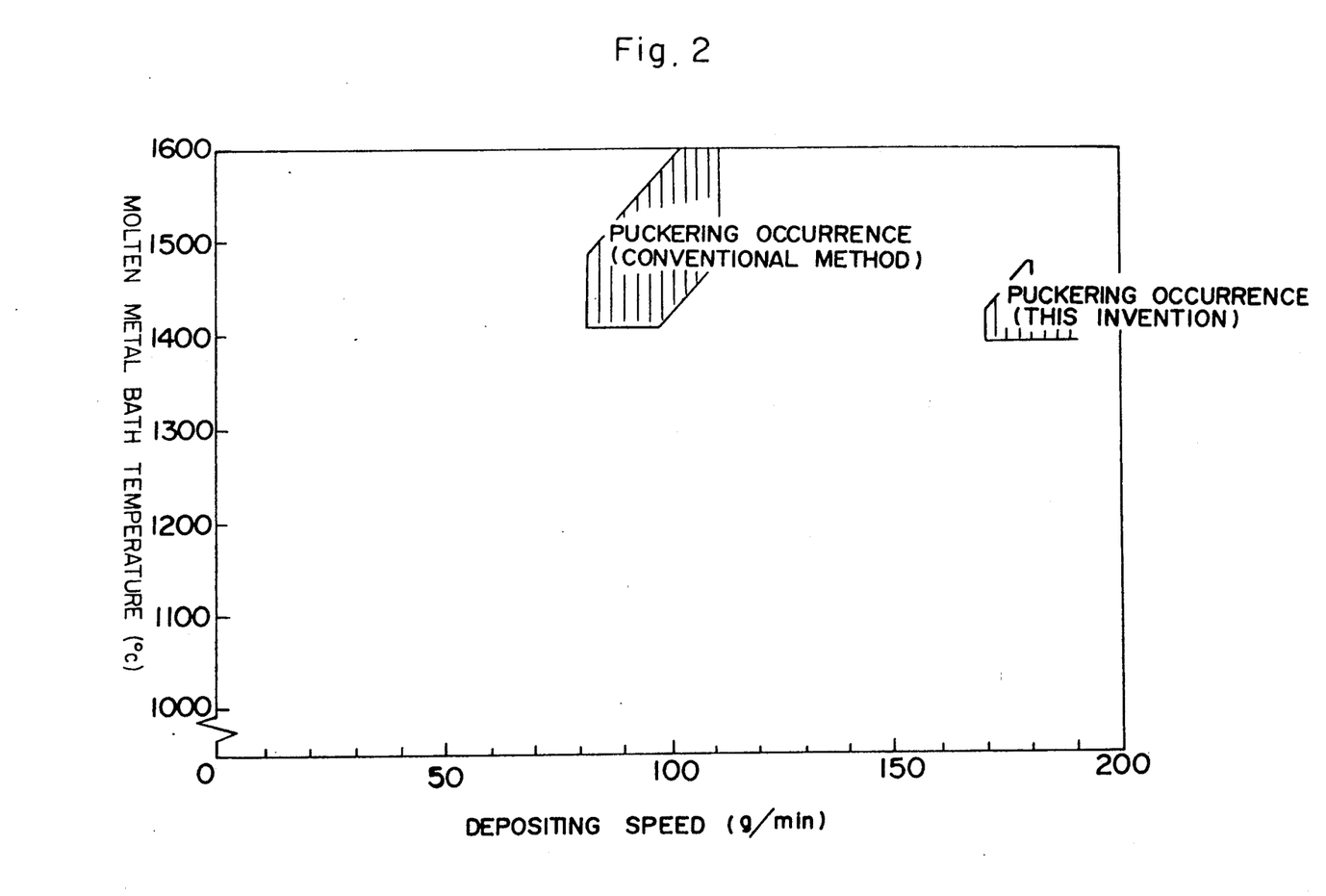
FIG. 2 is a graphical illustration comparing the occurrence of puckering when the method of this invention is employed and when conventional MIG welding is employed.

As shown in FIG. 2 puckering scarcely occurs in welds performed by the present invention at speeds where it is present in conventional welding.

Moreover, it was found that there were no significant differences in mechanical properties of the weld and the occurrence of blow holes between welds in accordance with the present invention and conventional welding. It was additionally noted that weld distortion was much less in welds performed by the method of the present invention.

EXAMPLE 5

Carbon steels were welded under the conditions listed in Table 6 in which the interwire angle, interwire-tip distance, and wire supply amount were varied as shown in Table 7. As seen in Table 7, excellent welds can be achieved for carbon steels under the following conditions: wire insertion angles ($\theta_1$, $\theta_2$) up to fifty degrees for both leading and trailing wires, interwire angle ($\theta_3$) up to twenty degrees; interwire-tip distance (L) up to twenty millimeters, and the utilization ratio of the consumable electrode wire and filler wire (r) within a range of 0.1–1.8.

Moreover, it was found that there were no significant differences in mechanical properties of the weld and the occurrence of blow holes between welds in accordance with the present invention and conventional welding. It was additionally noted that weld distortion was much less in welds performed by the method of the present invention.

EXAMPLE 6

Stainless steel was welded in accordance with the present invention, varying the wire insertion angles, interwire angles, interwire-tip distance, and wire utilization ratio, as listed in Table 9 holding other welding parameters constant as shown in Table 8.

Table 9 shows that the same welding conditions as noted in the previous examples for aluminum alloys and carbon steels produced excellent weld quality for stainless steel. Namely the wire insertion angles ($\theta_1$, $\theta_2$) can be up to fifty degrees for both the leading and trailing wires, the interwire angle ($\theta_3$) may be up to twenty degrees, the interwire-tip distance (L) may be up to twenty millimeters, and the supply ration between the consumable electrode wire and filler wire (r) may be within a range of 0.1–1.8.

Moreover, it was found that there were no significant differences in mechanical properties of the weld and the occurrence of blow holes between welds in accordance with the present invention and conventional welding. It was additionally noted that weld distortion was much less in welds performed by the method of the present invention.

In the aforementioned examples, the current which was divided through the filler wire inserted into the molten metal bath was varied from 3–25 A. Similar weld quality was obtained throughout this range.

While the interwire angle in the above embodiments between the consumable electrode wire and the filler wire was established to be a maximum of twenty degrees, it was found that consistently high quality welds can be produced at high speed and efficiency by reducing this angle to approach zero such that the wires are aligned in parallel.

Figure 4:
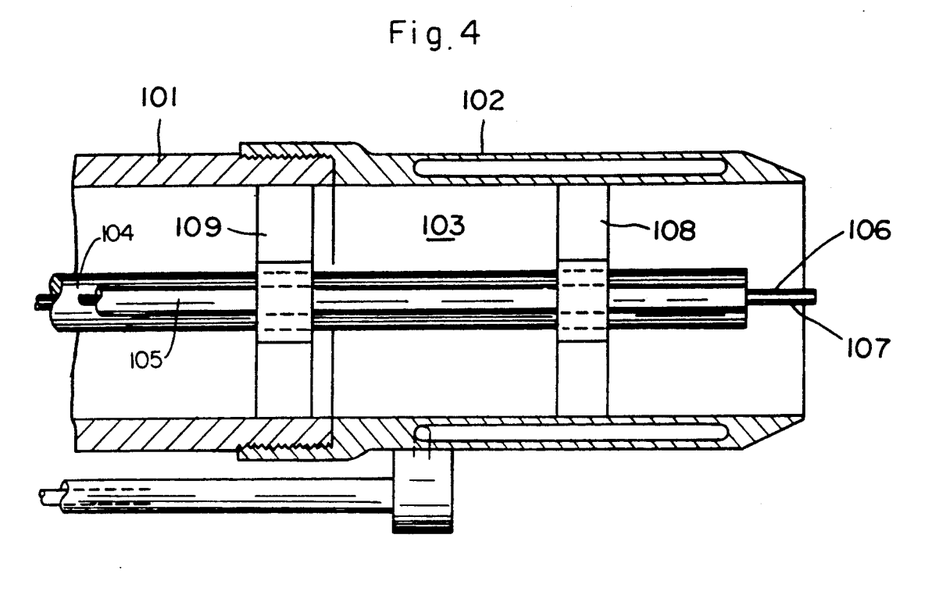
FIG. 4 is a partial side view in section of a welding torch in accordance with the present invention.
Figure 5:
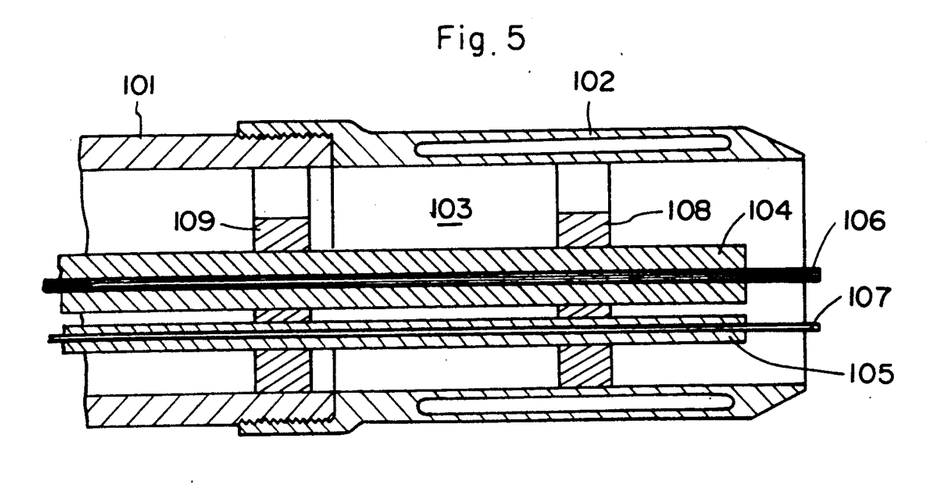
FIG. 5 is a partial top elevation in section showing the welding torch of FIG. 4.

In FIGS. 4 and 5 a gas shield 103 is formed by connecting nozzle 102 to the main body 101 of a welding torch. A conductive contact tube 104 for supplying consumable electrode wire is inserted through the rear along the central axis of the gas shield 103 to the proximal end of nozzle 102. An insulating contact tube 105 for supplying filler wire is inserted and mounted at the proximal end of nozzle 102 through the rear of gas shield 3 parallel to the conductive contact tube 104. A flexible conduit for supplying filler wire is connected to the rear end (not shown) of the insulating contact tube 105. Center guides 108 and 109 are provided. A single insulating contact tube 105 is mounted parallel to the conductive contact tube 104, as shown in FIG. 106(a), welding is limited to unidirectional operation (from left to right as illustrated in FIG. 106(a)). A fraction of the current flowing through consumable electrode wire 106 heats the filler wire 107. Turning now to FIG. 106(b), there is shown an embodiment where two contact tubes 105(a) and 105(b) for supplying filler wire 107 are mounted diametrically opposite the conductive contact tube 104. If a flexible conduit for supplying the filler wire 107 is connected to the insulating contact tube on the left 105(a), welding would proceed from left to right. When the flexible conduit is connected to the insulating contact tube 105(b) on the right side, welding will proceed from right to left, so that bi-directional welding can be achieved.

Figure 6A:
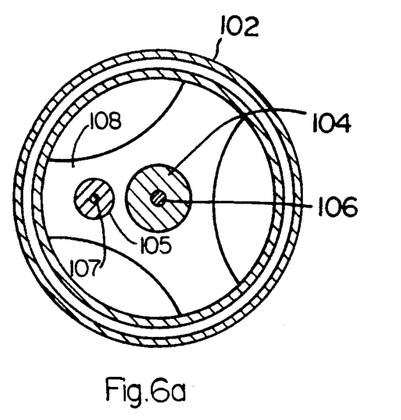
FIGS. 6(a), 6(b) and 6(c) are sectional views of the nozzle showing alternate embodiments of the present invention.
Figure 6B:
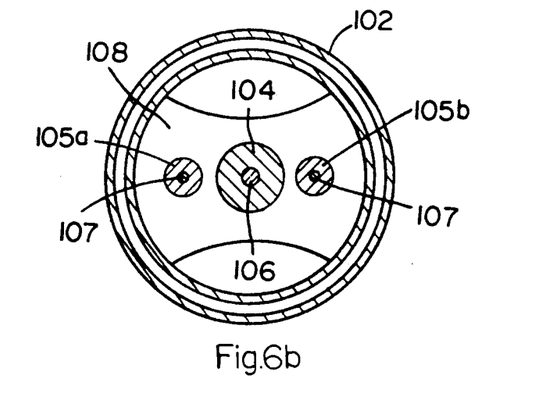
Figure 6C:
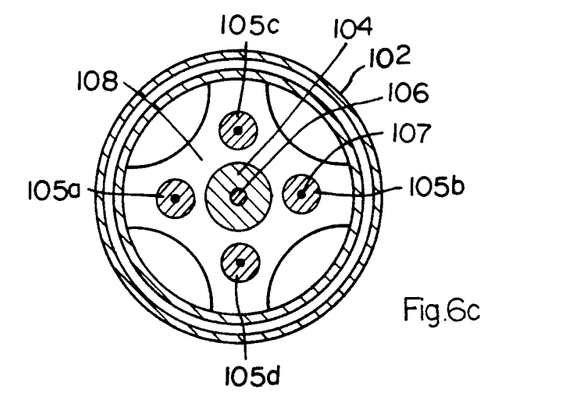

FIG. 106(c) shows an embodiment of the invention wherein insulating contact tubes 105(a), 105(b), 105(c), and 105(d) for supplying filler wire 107 are positioned above and below, as well as to the left and the right of the conductive contact tube 104. In the embodiment depicted in FIG. 106(c), welding can occur in four directions by appropriately selecting sources of flexible conduit for supplying filler wire 107.

Figure 7:
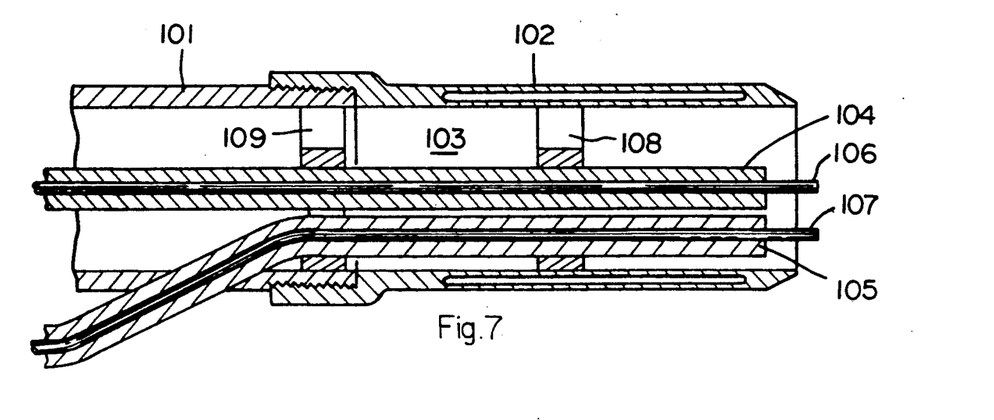
FIG. 7 is a partial top elevation in section of a further embodiment of the present invention wherein the insulating contact tube is bend-inserted into a shield gas nozzle.

In FIG. 7 an insulating contact tube 105(a) for supplying filler wire 107 is bend-inserted through the rear of gas shield 103 and is mounted within gas shield 3 parallel to the conductive contact tube 104.

According to the present invention, as illustrated in FIGS. 4–7, welding torches having both consumable electrode wire and filler wire can be provided by a single welding unit because the insulating contact tube 105 is mounted inside gas shield 103 of the welding torch parallel to conductive contact tube 104.

Hence, in the present invention a quantity of metal can be deposited by a single unit which is an improvement over conventional techniques where individual torches for consumable electrode wire and filler wire are employed. Moreover, following the teachings of the present invention, the welding unit is much lighter, enabling a welder to carry or hold it during the welding operation. Few heavy components are required, since both the insulating contact tube 105 is mounted on a single conventional welding torch and a flexible conduit for supplying filler wire 107 is connected.

Furthermore, by having two or four insulating contact tubes for supplying filler wire mounted within the gas shield and by changing connections to the flexible conduit for supplying filler wire thereof, it is possible to operate the welder in up to four directions.

Figure 8:
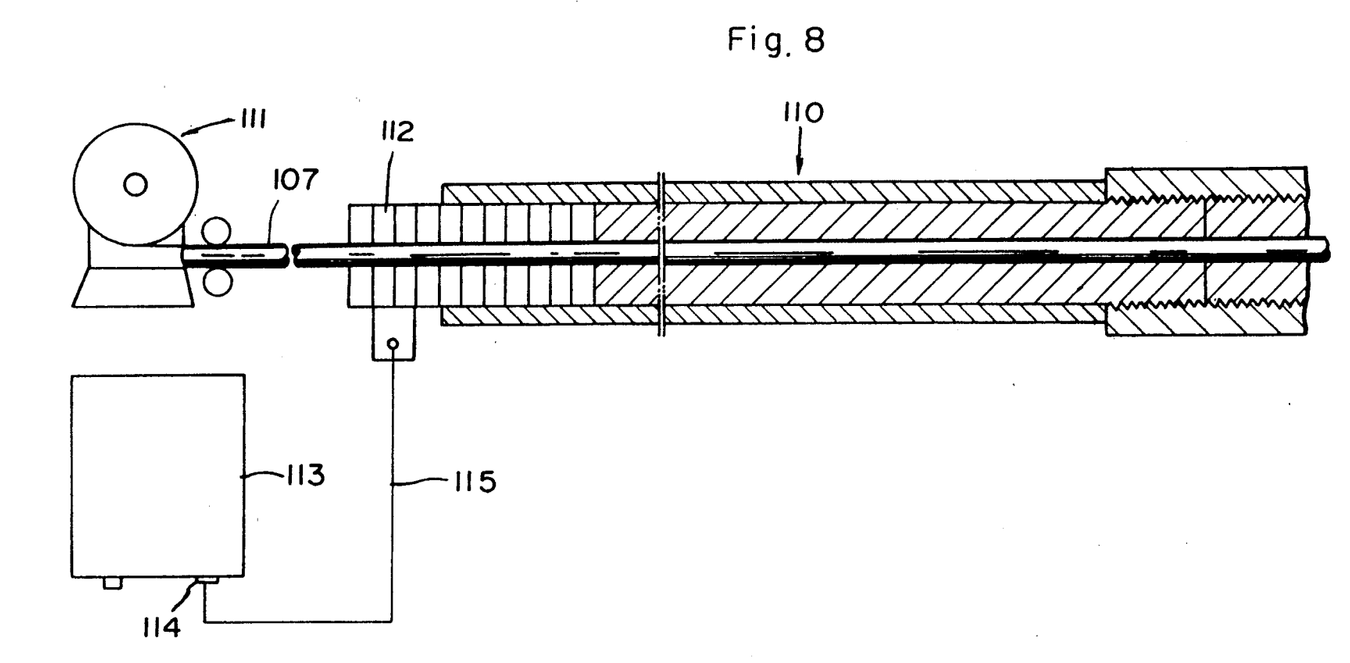
FIG. 8 is a schematic illustration showing apparatus for dividing current through the filler wire to a ground terminal of the welding current source.

FIG. 8 illustrates the division of a portion of the welding current through the filler wire 107 to a ground terminal of the welding power supply. Conductive contact chip 112 is positioned within the rear end of insulating flexible conduit 110 for supplying filler wire 107 at the point where filler wire is received from wire feeding device 111. Contact chip 112 is connected to ground terminal 114 of the welding supply 113 by connecting wire 115.

With the above arrangement, a part of the welding current flowing from the electrode wire to the base metal can be divided through filler wire 107 which is inserted into the molten bath. The current returns to the ground terminal 114 of the welding power supply 113 through contact chip 112 and connecting wire 115.

The conductive contact chip 112 can be mounted behind the insulating contact tube. By so connecting the conductive contact chip to the conduit filler wire, current division can be effected as explained above. Alternatively, some of the welding current current may be introduced to the ground terminal of the welding power supply through the filler wire by attaching a lead wire to the flexible conduit near the entry into the insulating contact tube, mounting the conducting contact chip in contact with the lead wire in engagement with the flexible conduit and the insulating contact tube and by attaching the lead wire to the ground terminal of the welding power source.

While this invention has been explained with reference to the structure disclosed herein, it is not confined to the details as set forth and this application is intended to cover any modifications and changes as may come within the scope of the following claims.

TABLE 1

| | |
|---|---|
| shield gas | $CO_2$ 100% |
| shield gas flow rate | 150 L/min |
| consumable electrode wire | |
| material | YGW11 |
| angle | $\theta_1$ |
| wire diameter | 4.0 mm |
| filler wire | |
| material | YGW11 |
| angle | $\theta_2$ |
| wire diameter | 3.2 mm |
| angle between advancing and receding wires | $\theta_3$ |

TABLE 2

| sample No. | weld current (A) | wire inserting angle $\theta_1$ | wire inserting angle $\theta_2$ | angle between wires $\theta_3$ | welding speed (m/min) | undercutting appearance | inner cracks, poor weldment |
|---|---|---|---|---|---|---|---|
| 1 | 1350 | −15 | — | — | 7 | ○ | ○ |
| 2 | 1350 | −15 | — | — | 8 | × | × |
| 3 | 1500 | +5 | +5 | 0 | 12 | ○ | ○ |
| 4 | 1500 | −5 | −5 | 0 | 12 | ○ | ○ |
| 5 | 1500 | −5 | +10 | 15 | 12 | ○ | ○ |
| 6 | 1500 | −15 | +10 | 25 | 12 | △ | × |
| 7 | 1500 | +5 | +5 | 0 | 12 | × | × | note
(1) Sample No. 1 and 2 were welded by the conventional method.
(2) The wire tip-distance for sample No. 3 to 7 was 50 mm.
(3) Sample No. 7 was done while the filler wire was advanced.
+: forward angle
−: backward angle

TABLE 3

| | weld speed (m/min) | under-cutting | appearance | x-ray | sputtering |
|---|---|---|---|---|---|
| con-ventional | 1.6 | ○ | ○ | ○ | ○ |
| | 1.8 | ○ | × | × | × |
| | 2.0 | × | × | × | × |
| this invention | 2.0 | ○ | ○ | ○ | ○ |
| | 2.4 | ○ | ○ | ○ | ○ |
| | 2.6 | ○ | × | × | × |

TABLE 3-continued

| weld speed (m/min) | under-cutting | appearance | x-ray | sputtering |
|---|---|---|---|---|
| 2.8 | × | × | × | × |

○: good
×: poor

TABLE 4

| | |
|---|---|
| weld current | 300 A |
| weld speed | 1 m/min |
| shield gas | Ar 100% |
| shield gas flow rate | 25 L/min |
| consumable electrode wire | |
| material | A 5183 |
| angle | $\theta_1$ |
| wire diameter | 2.4 mm |
| filler wire | |
| material | A 5183 |
| angle | $\theta_2$ |
| wire diameter | 1.6 mm |
| angle between advancing and receding wires | $\theta_3$ |
| wire tip-distance | L |
| supply ratio between consumable electrode wire and filler wire | r |

TABLE 5

| sample No. | wire inserting angle $\theta_1$ | $\theta_2$ | wire angles $\theta_3$ | wire tip-distance L (mm) | supply ratio r | evaluation |
|---|---|---|---|---|---|---|
| 1 | −60 | −60 | 0 | 7 | 1 | × |
| 2 | −55 | −55 | 0 | 7 | 1 | × |
| 3 | −50 | −50 | 0 | 7 | 1 | ○ |
| 4 | −30 | −30 | 0 | 7 | 1 | ○ |
| 5 | −15 | −15 | 0 | 7 | 1 | ○ |
| 6 | 0 | 0 | 0 | 7 | 1 | ○ |
| 7 | +15 | +15 | 0 | 7 | 1 | ○ |
| 8 | +30 | +30 | 0 | 7 | 1 | ○ |
| 9 | +50 | +50 | 0 | 7 | 1 | ○ |
| 10 | +55 | +55 | 0 | 7 | 1 | × |
| 11 | +60 | +60 | 0 | 7 | 1 | × |
| 12 | +15 | +20 | 5 | 7 | 1 | ○ |
| 13 | +15 | +25 | 10 | 7 | 1 | ○ |
| 14 | +15 | +30 | 15 | 7 | 1 | ○ |
| 15 | +15 | +35 | 20 | 7 | 1 | ○ |
| 16 | +15 | +38 | 23 | 7 | 1 | × |
| 17 | +15 | +15 | 0 | 3 | 1 | ○ |
| 18 | +15 | +15 | 0 | 15 | 1 | ○ |
| 19 | +15 | +15 | 0 | 20 | 1 | ○ |
| 20 | +15 | +15 | 0 | 22 | 1 | × |
| 21 | +15 | +15 | 0 | 7 | 0.1 | ○ |
| 22 | +15 | +15 | 0 | 7 | 1.5 | ○ |
| 23 | +15 | +15 | 0 | 7 | 1.8 | ○ |
| 24 | +15 | +15 | 0 | 7 | 1.9 | × |

+: forward angle
−: backward angle

TABLE 6

| | |
|---|---|
| weld current | 300 A |
| weld speed | 1 m/min |
| shield gas (Ar + CO₂) | 80 + 20% |
| shield gas flow rate | 25 L/min |
| consumable electrode wire | |
| material | mild steel |
| angle | $\theta_1$ |
| wire diameter | 1.6 mm |
| filler wire | |
| material | mild steel |
| angle | $\theta_2$ |
| wire diameter | 1.2 mm |
| angle between advancing and receding wires | $\theta_3$ |
| wire tip-distance | L |
| supply ratio between consumable electrode wire and filler wire | r |

TABLE 7

| sample No. | wire inserting angle $\theta_1$ | $\theta_2$ | wire angles $\theta_3$ | wire tip-distance L (mm) | supply ratio r | evaluation |
|---|---|---|---|---|---|---|
| 1 | −60 | −60 | 0 | 7 | 1 | × |
| 2 | −55 | −55 | 0 | 7 | 1 | × |
| 3 | −50 | −50 | 0 | 7 | 1 | ○ |
| 4 | −30 | −30 | 0 | 7 | 1 | ○ |
| 5 | −15 | −15 | 0 | 7 | 1 | ○ |
| 6 | 0 | 0 | 0 | 7 | 1 | ○ |
| 7 | +15 | +15 | 0 | 7 | 1 | ○ |
| 8 | +30 | +30 | 0 | 7 | 1 | ○ |
| 9 | +50 | +50 | 0 | 7 | 1 | ○ |
| 10 | +55 | +55 | 0 | 7 | 1 | × |
| 11 | +60 | +60 | 0 | 7 | 1 | × |
| 12 | +15 | +20 | 5 | 7 | 1 | ○ |
| 13 | +15 | +25 | 10 | 7 | 1 | ○ |
| 14 | +15 | +30 | 15 | 7 | 1 | ○ |
| 15 | +15 | +35 | 20 | 7 | 1 | ○ |
| 16 | +15 | +38 | 23 | 7 | 1 | × |
| 17 | +15 | +15 | 0 | 3 | 1 | ○ |
| 18 | +15 | +15 | 0 | 15 | 1 | ○ |
| 19 | +15 | +15 | 0 | 20 | 1 | ○ |
| 20 | +15 | +15 | 0 | 22 | 1 | × |
| 21 | +15 | +15 | 0 | 7 | 0.1 | ○ |
| 22 | +15 | +15 | 0 | 7 | 1.5 | ○ |
| 23 | +15 | +15 | 0 | 7 | 1.8 | ○ |
| 24 | +15 | +15 | 0 | 7 | 1.9 | × |

+: forward angle
−: backward angle

TABLE 8

| | |
|---|---|
| weld current | 300 A |
| weld speed | 1 m/min |
| shield gas (Ar + O₂) | 98 + 2% |
| shield gas flow rate | 25 L/min |
| consumable electrode wire | |
| material | SUS 304 |
| angle | $\theta_1$ |
| wire diameter | 1.6 mm |
| filler wire | |
| material | SUS 304 |
| angle | $\theta_2$ |
| wire diameter | 1.2 mm |
| angle between advancing and receding wires | $\theta_3$ |
| wire tip-distance | L |
| supply ratio between consumable electrode wire and filler wire | r |

TABLE 9

| sample No. | wire inserting angle $\theta_1$ | $\theta_2$ | wire angles $\theta_3$ | wire tip-distance L (mm) | supply ratio r | evaluation |
|---|---|---|---|---|---|---|
| 1 | −60 | −60 | 0 | 7 | 1 | × |
| 2 | −55 | −55 | 0 | 7 | 1 | × |
| 3 | −50 | −50 | 0 | 7 | 1 | ○ |
| 4 | −30 | −30 | 0 | 7 | 1 | ○ |
| 5 | −15 | −15 | 0 | 7 | 1 | ○ |
| 6 | 0 | 0 | 0 | 7 | 1 | ○ |
| 7 | +15 | +15 | 0 | 7 | 1 | ○ |
| 8 | +30 | +30 | 0 | 7 | 1 | ○ |
| 9 | +50 | +50 | 0 | 7 | 1 | ○ |
| 10 | +55 | +55 | 0 | 7 | 1 | × |
| 11 | +60 | +60 | 0 | 7 | 1 | × |
| 12 | +15 | +20 | 5 | 7 | 1 | ○ |
| 13 | +15 | +25 | 10 | 7 | 1 | ○ |
| 14 | +15 | +30 | 15 | 7 | 1 | ○ |
| 15 | +15 | +35 | 20 | 7 | 1 | ○ |
| 16 | +15 | +38 | 23 | 7 | 1 | × |
| 17 | +15 | +15 | 0 | 3 | 1 | ○ |
| 18 | +15 | +15 | 0 | 15 | 1 | ○ |
| 19 | +15 | +15 | 0 | 20 | 1 | ○ |
| 20 | +15 | +15 | 0 | 22 | 1 | × |
| 21 | +15 | +15 | 0 | 7 | 0.1 | ○ |
| 22 | +15 | +15 | 0 | 7 | 1.5 | ○ |
| 23 | +15 | +15 | 0 | 7 | 1.8 | ○ |

TABLE 9-continued

| sample No. | wire inserting angle $\theta_1$ | $\theta_2$ | wire angles $\theta_3$ | wire tip-distance L (mm) | supply ratio r | evaluation |
|---|---|---|---|---|---|---|
| 24 | +15 | +15 | 0 | 7 | 1.9 | × |

+: forward angle
−: backward angle

What is claimed is:

1. A method of consumable electrode arc welding comprising the steps of
    inserting a leading consumable electrode wire and a trailing filler wire inside a gas shield nozzle such that the angle between the wires is no greater than 20 degrees,
    connecting the consumable electrode wire and base metal to be welded to a power source, and passing electric current through said consumable electrode wire in a first direction,
    connecting the gas shield nozzle to a source of arc welding gas,
    generating an arc between the consumable electrode wire and the base metal to form a molten metal bath and deposit a weld on said base metal,
    inserting the filler wire into the molten metal bath,
    conducting a fraction of the current passing through the consumable electrode wire through the filler wire in a direction opposing said first direction to heat said filler wire and transfer metal therefrom to the molten metal bath, and returning the current passing through the filler wire to a ground terminal of the power source.

2. The method of claim 1 further comprising the steps of
    inserting the consumable electrode wire and the filler wire into the area to be welded at a forward or reverse insertion angle which does not exceed 50 degrees,
    positioning the consumable electrode wire and the filler wire so that the interwire-tip distance in mm. does not exceed 20 times the square root of the welding speed in m/min, and
    maintaining the utilization ratio of filler wire to consumable electrode wire within a range of 0.1 to 1.8.

3. A consumable electrode arc welding torch including
    a housing having a weld head,
    a shield nozzle mounted at the weld head of said housing to conduct arc welding gas from a remote source to a base metal to be welded,
    a conductive contact tube coaxially disposed within said shield nozzle for transferring a consumable electrode wire from a first wire supply source to the interior of said shield nozzle to place said consumable electrode wire in contact with arc welding gas flowing within said shield nozzle, said conductive contact tube having an uncapped distal end, and
    an insulating contact tube mounted within said shield nozzle in parallel alignment with said conductive contact tube for transferring a filler wire from a second wire supply source to said insulating contact tube having an uncapped distal end,
    said consumable electrode wire and said filler wire connected to a remote electrical power source, means for connecting the base metal and the filler wire to the power supply ground terminal, so that a portion of said electrical power flowing from the consumable electrode wire to the base metal and flows in opposite directions through the filler wire when an arc is generated between said consumable electrode wire and the base metal.

4. The welding torch of claim 3 having two insulating contact tubes mounted within said shield nozzle in parallel alignment with said conductive contact tube and on opposite sides thereof.

5. The welding torch of claim 3 having four insulating contact tubes mounted within said shield nozzle in parallel alignment with said conductive contact tube and equally distributed around said conductive contact tube at substantially 90 degree intervals, at least one of said insulating contact tubes being selectively supplied with filler wire, whereby said torch can be switchably operated in given directions without reorientation of said torch.

* * * * *

UNITED STATES PATENT AND TRADEMARK OFFICE
CERTIFICATE OF CORRECTION

PATENT NO. : 5,124,527
DATED : June 23, 1992
INVENTOR(S) : Hideaki Takano et al.

It is certified that error appears in the above—identified patent and that said Letters Patent is hereby corrected as shown below:

On title page, item [75] after the Inventor's names add -- Yuji Nakahara and Hideki Miyauchi, also of Wakayama, Japan--.

Signed and Sealed this

Fifth Day of July, 1994

Attest:

BRUCE LEHMAN

*Attesting Officer*      *Commissioner of Patents and Trademarks*